Nov. 26, 1957  J. T. MENDEL  2,814,779
MICROWAVE DETECTOR
Filed Dec. 14, 1954  3 Sheets-Sheet 2

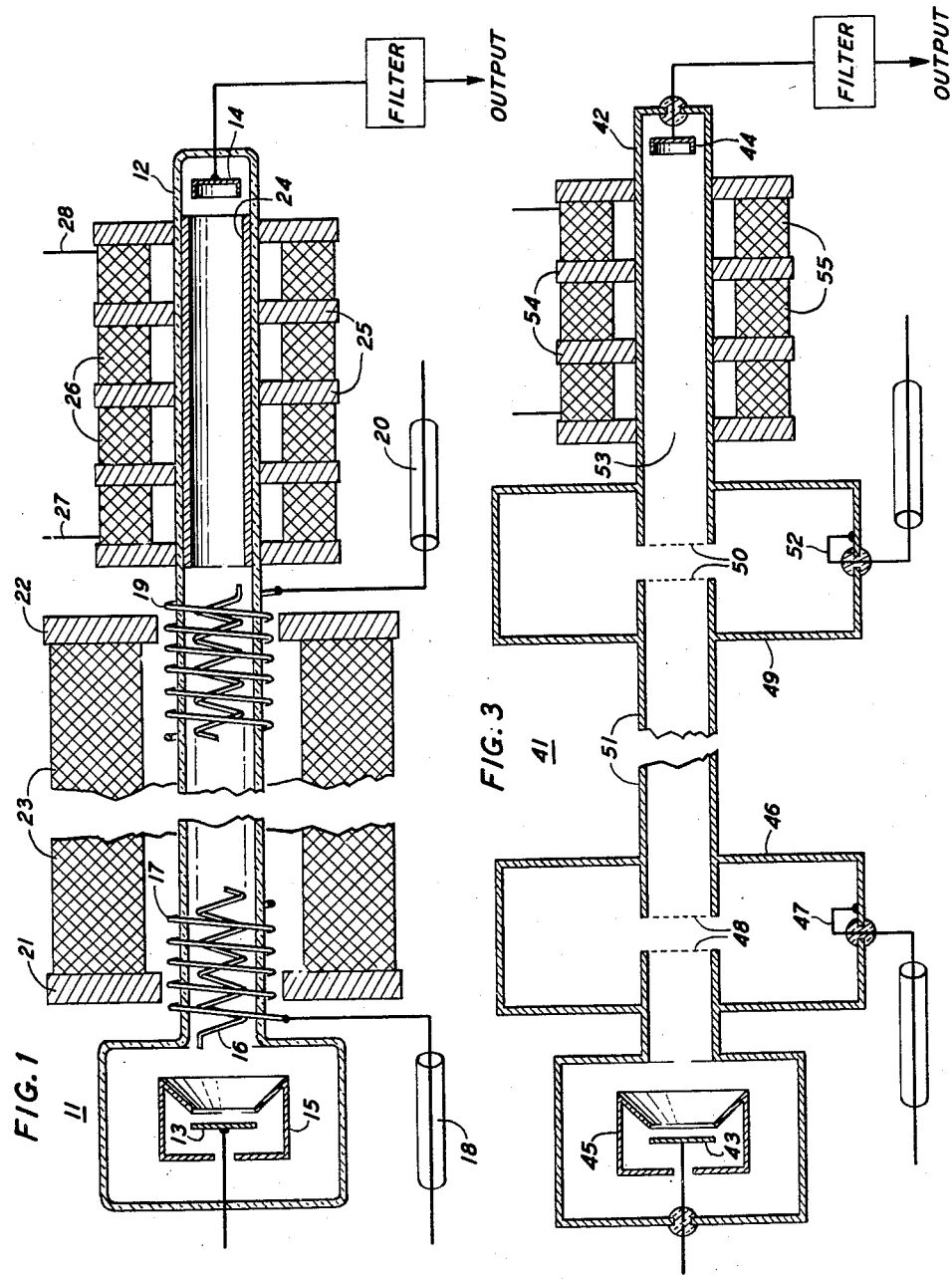

INVENTOR
J. T. MENDEL
BY
Hugh S. Wertz
ATTORNEY

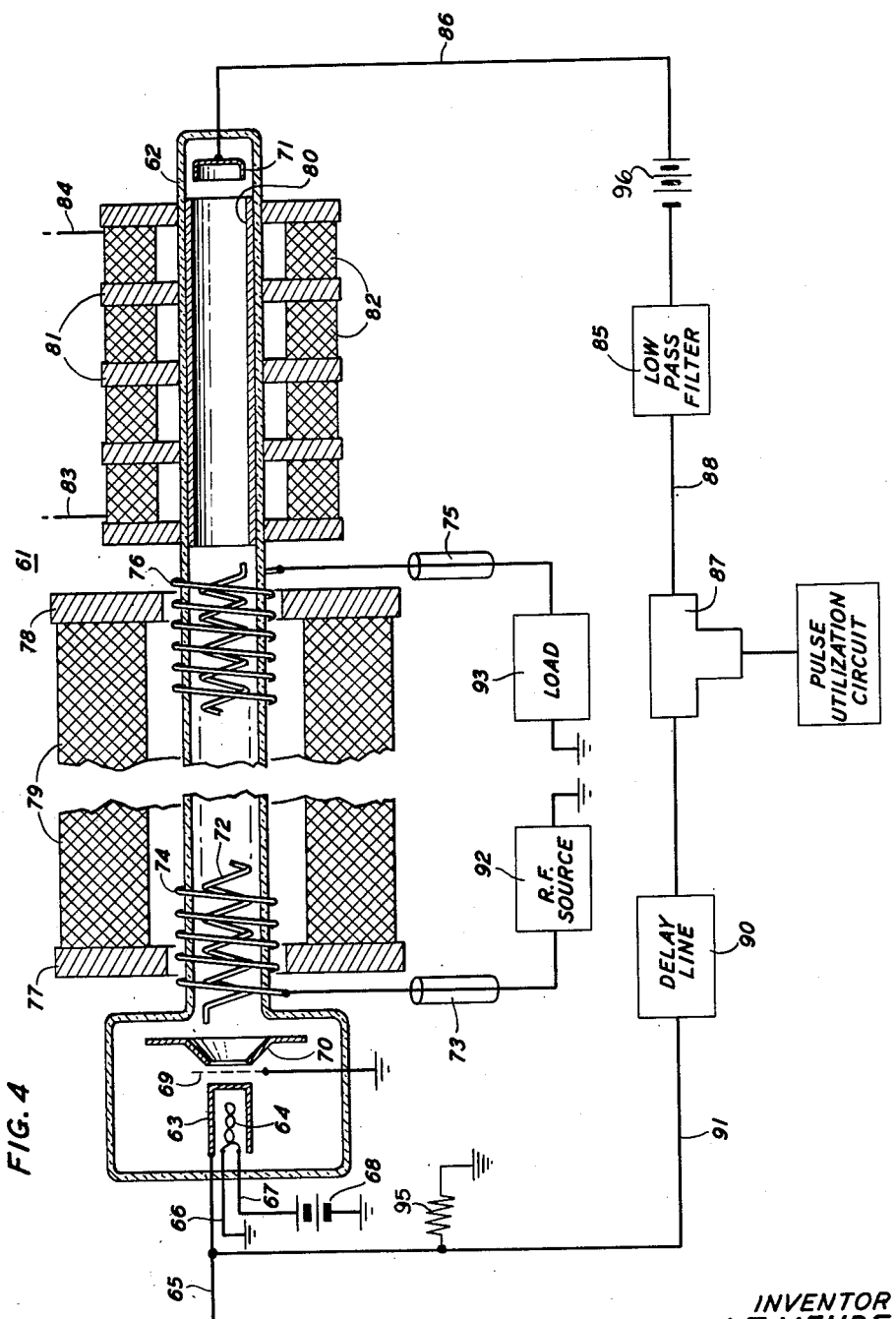

United States Patent Office 2,814,779
Patented Nov. 26, 1957

2,814,779

MICROWAVE DETECTOR

John T. Mendel, Berkeley Heights, N. J., assignor to Bell Telephone Laboratories, Incorporated, New York, N. Y., a corporation of New York Application December 14, 1954, Serial No. 475,232

21 Claims. (Cl. 332—7)

This invention relates to devices which utilize the interaction between an electron beam and an electromagnetic wave signal to produce a velocity modulation of the beam. Such devices are commonly described as velocity modulation tubes and are exemplified by klystrons, traveling wave tubes and the like.

It is an object of the invention to provide a velocity modulation tube detector.

More particularly it is an object of this invention to provide a focusing arrangement for velocity modulation tubes which results in a collector or anode current that is proportioned to the signal level or modulation of the input wave.

In general, the term "detector" is descriptive of those devices which perform the function of deriving from a modulated input wave a voltage or current which is dependent upon variations in signal level or amplitude resulting from the modulation. In the lower frequency ranges the detecting of amplitude modulation signals is usually performed by diode rectifiers which rectify the signal input to produce a D.-C. voltage which varies as the modulation envelope. Inasmuch as in the higher frequency ranges it becomes impracticable to use conventional diode tubes since the dimensions of the tubes approximate a wavelength and transit time becomes a factor, it becomes necessary to use other methods of detection. One common type of high frequency detecting arrangement involves the use of crystals in place of the lower frequency diodes and filters. Such arrangements are exceedingly narrow band and require careful matching to the input and output circuits for proper operation. In addition, crystal detecting cannot be carried out at high power levels.

Velocity modulation tubes offer the advantages both of broadband operation and of higher power levels than are possible with crystal detectors, and, consequently, detecting arrangements have been proposed using a velocity modulation tube. Such arrangements usually comprise a means for velocity modulating the electron beam in accordance with the modulating information and then subjecting it to a magnetic or electrostatic deflecting field which deflects the beam axis in accordance with the velocity modulations. The amount of axial deflection of the beam depends upon the electron velocity, and some suitable arrangement is used to measure the amount of beam deflection, thereby yielding an output proportional to the modulation envelope.

The present invention makes use of periodic focusing of the electron beam and the attendant phenomena to achieve detection without deflection of the axis of the beam with a consequent greater simplicity of construction of the detector tube and its associated circuitry, and greater dependability of performance.

For a thorough treatment of periodic focusing, reference may be made to an article entitled "Electron Beam Focusing with Periodic Permanent Magnet Fields" by J. T. Mendel, C. F. Quate, and W. H. Yocom in Proceedings of the I. R. E., vol. 42, pp. 800-810, May 1954. However, a brief description of this type of focusing will be given here to facilitate an understanding of the invention. It is to be understood that while the principles of the invention will be set forth with greatest particularity in its application to magnetic focusing, the invention is equally applicable to use of other equivalent types of focusing such as electrostatic, and applicant does not intend to limit himself to magnetic focusing alone.

It has been found that good focusing can be achieved with a minimum of driving force by concentrating the focusing field along a periodic series of short gaps along the beam path. For example, in the form of magnetic focusing of greatest interest, there is employed a series of regions of longitudinal magnetic fields. Assuming that along the length of the path of flow the regions of longitudinal magnetic field are short compared to the distance separating them, the succession of focusing fields may be regarded as a series of thin converging lenses. The converging effect of the lenses is on the average just balanced out by the diverging effect of the space charges within the beam between the lenses, and the electron beam flow is identical between each pair of lenses. It has been found in practice that if alternate focusing fields are opposite in sense, the weight and space requirements in a permanent magnet system are greatly decreased. Unlike the case of a uniform magnetic field, in the periodic field the focusing is not necessarily improved by increasing the magnetic field strength beyond the theoretical required value. Instead there are encountered regions of magnetic field strength which cause the beam to diverge. For a given magnetic field strength, the velocity of an electron within the beam determines whether that particular electron is focused or defocused. Defocused electrons, if the defocusing is sufficient, may be completely expelled from the beam. This difference in behavior of electrons within the beam under the influence of a periodic magnetic field gives rise to "pass" bands, that is, for a given magnetic field a range of velocities where the electrons will be focused, and "stop" bands, where, for the same magnetic field, there is a range of velocities where the electrons will be defocused. As a result of this phenomenon, the collector current can be made to vary in accordance with changes in the average beam velocity and in accordance with excursions of electron velocities from the average. The degree of change of collector current with changes in velocities depends upon the slope of the line defining the pass band and the stop band, the steeper the slope, the greater the collector current change for a given change in velocity.

The present invention makes use of this phenomenon in a manner which will be more fully explained hereinafter to cause the collector current to vary greatly for velocity changes in one direction, i. e., velocities less than the average beam velocity, and to vary only slightly, if at all, for velocity changes in the other direction, i. e., velocities faster than the average velocity. The net result is that a collector output current is achieved which is dependent upon signal level or the envelope of modulation.

In a preferred embodiment of the invention, a succession of magnetic pole pieces are spaced uniformly along a drift space region beyond the output end of the wave circuit of a traveling wave tube. The pole pieces are joined together by permanent magnets or electromagnetic coils in such a manner that adjacent pole pieces will be of opposite polarity. Such an arrangement has the effect of imparting a uniform periodicity to the magnetic focusing field. At the downstream end of the drift space is situated a collector electrode. A modulated R. F. signal is fed to the tube and interacts with the electron beam to velocity modulate it, imparting to the electrons in the beam velocities which vary in accordance with the modulating information. The focusing parameters are so chosen that the average beam velocity falls within a pass band at a point where collector current varies greatly with decreased electron velocities, but only slightly with increased velocities, with the result that the collector output is a D.-C. current which varies in accordance with the modulating information.

Various other illustrative embodiments will be described herein, each of which is characterized by an arrangement establishing along the beam path a periodic focusing arrangement, the parameters of which are adjusted to give detector action.

The invention will be better understood from the following detailed description taken in conjunction with the drawings, in which:

Fig. 1 is a schematic sectional elevation view of a traveling wave tube embodying the principles of the invention;

Fig. 3 is a schematic sectional elevation view of a klystron tube embodying the principles of the present invention; and Fig. 4 is a schematic sectional elevation view of a traveling wave tube and the associated circuitry of a special application of the principles of the invention.

Figure 2A:
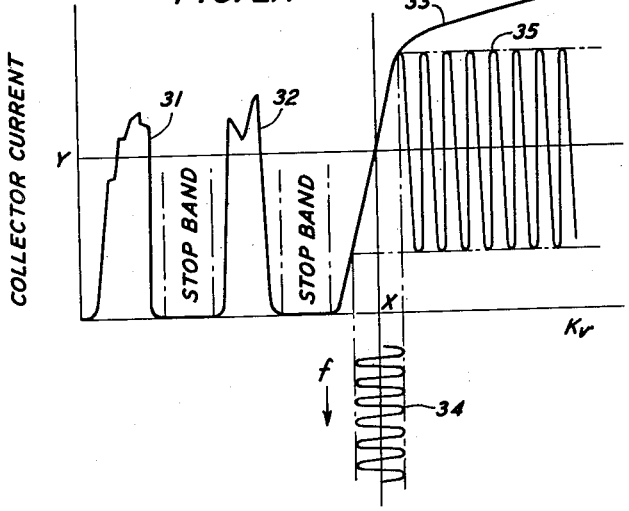
Figs. 2A and 2B are plots which illustrate the principles of the invention.

Turning now to the drawings, in Fig. 1 there is illustrated schematically a traveling wave tube 11 embodying the principles of the invention. Located at opposite ends of an evacuated elongated envelope 12, which, for example, is of glass, any suitable nonmagnetic material, or magnetic material which will saturate readily, are a source of a beam of electrons 13 and a target or collector electrode 14. The electron source 13 is shown schematically and will, in general, consist of an electron emissive cathode, a heater unit, an intensity control element, and an electrode arrangement 15 for shaping and accelerating the beam. The target 14 serves as a collector of electrons and is, accordingly, maintained at a suitable potential positive with respect to the electron emissive cathode of the source 13 by means of suitable lead-in connections from a voltage source, not here shown. In conventional traveling wave tubes an electrode member maintained at a positive potential with respect to the cathode of the electron source is disposed along the path of flow for providing an accelerating field. In most traveling wave tubes, the interaction circuit itself serves as such an electrode. In the tube of Fig. 1, the interaction circuit comprises a helically coiled conductor 16, a plurality of operating wavelengths long, which serves as a propagating circuit for electromagnetic waves. The pitch of the helix determines the velocity with which the wave propagates down the length of the tube, and this pitch is adjusted to propagate the wave in coupling relationship with the beam. In addition, the helical interaction circuit 16, in the embodiment here shown, serves as the accelerating electrode for the electron beam, and so is maintained at a suitable positive potential with respect to the cathode of the electron gun by suitable means, not here shown.

At each end, the helix 16 is connected to an external transmission line by a suitable coupling. As shown, at the input end, the coupling means comprises the helix 17 wound in a sense opposite to that of helix 16 and surrounding the tube envelope along a region overlapping the input end of the helix 16. The end of the helix 17 adjacent the end of the helix 16 is connected to the inner conductor of the coaxial line 18 which forms the external transmission line leading to the signal source and the opposite end of helix 17 is terminated to be substantially reflectionless. Coupled helix arrangements of this kind are described more fully in copending application Serial No. 360,579, filed June 9, 1953, by R. Kompfner. At the output end of the helix 16, that is, the end remote from electron source 13, energy is transferred for utilization from the helix 16 to an external transmission line 20 by coupled helix 19, in a manner analogous to that described for the input end. Various other arrangements for coupling to and from a helix interaction circuit may be substituted for that here shown. It is to be understood also that while the interaction circuit is shown as helix 16, it may take any one of a number of forms well known to those skilled in the art, such as, for example, a waveguide with serrated or ridged walls.

Focusing of the electron beam along the interaction circuit is accomplished by a uniform magnetic field, which is supplied by pole pieces 21 and 22 and a magnet 23. Pole pieces 21 and 22 may take the form of annular rings of suitable material surrounding envelope 12, or they may take the form of a plurality of individual pole pieces uniformly spaced about the envelope creating, for example, a quadripolar arrangement. The maget 23 may take the form of an annular permanent magnet, or an electromagnetic solenoid, or, in the case of quadripolar focusing, a plurality of bar magnets between pairs of pole pieces. Various other suitable focusing arrangements may be used in place of the arrangements here shown as will be apparent to those skilled in the art, and applicant does not intend to limit himself to the specific arrangements here shown.

Extending along the path of flow from a point adjacent the output end of helix 16 to a point adjacent collector anode 14 is a drift tube 24 of copper or other suitable non-magnetic conducting material, establishing a drift space a plurality of operating wavelengths long for the electron beam. Coextensive with drift tube 24 is a magnetic focusing region which is formed by a plurality of pole pieces 25, 25 uniformly spaced from each other by magnets 26, 26. As in the case of pole pieces 21 and 22, pole pieces 25, 25 may be annular rings or a plurality of individual members disposed about the axis of the tube. Likewise, magnets 26 may be permanent magnets or electromagnets, and either annular in shape or straight, depending upon the configuration of pole pieces 25, 25. For reasons which will be apparent later, it is preferable that magnets 26, 26 be adjustable as to strength, and they are shown in Fig. 1 as a plurality of electromagnets connected in series and supplied with current by any suitable means, not shown, through leads 27 and 28. As was pointed out in the foregoing, periodic focusing consists of a plurality of regions of magnetic field. Furthermore, it is preferable that these regions be of alternating polarity. To achieve this spatially alternating characteristic, the individual magnets 26, 26 are serially connected so that alternate ones are of opposite polarity.

Figure 2B:
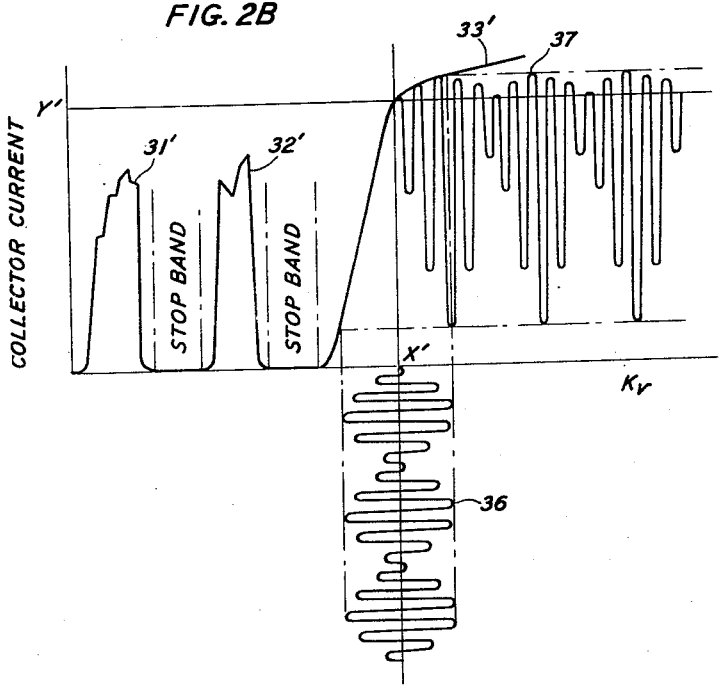

The operation of the arrangement of Fig. 1 will best be understood by reference to Figs. 2A and 2B. In Fig. 2A is shown a plot of collector current versus electron velocity for a periodic focusing arrangement. A detailed explanation of the plot is found in the aforementioned article by Mendel, Quate, and Yocom, however, a brief explanation of the significance of the curves is in order here. The abscissa of the plot represents a constant times the electron velocity. The constant includes the parameters of the periodicity and spacing of the focusing regions and the strength thereof, and thus the value of the constant may vary for different applications of periodic focusing. It can be seen from Fig. 2A that at zero velocity the collector current is zero, but as velocity is increased, collector current increases to a maximum value and then decreases to zero, as represented by the curve 31. Continued increase in velocity will produce no collector current until the point on the abscissa where the curve 32 begins. Increasing velocity further will result in increasing and then decreasing collector current until zero current is again reached. Still further increase in velocity produces no change in current until that point on the abscissa where the curve 33 begins. Continued velocity increase results in a rapidly increasing current, as shown by curve 33 until a "knee" is reached where further velocity increase results in only a slight current increase. The curves 31, 32, and 33 represent the pass bands of the focusing arrangement, where at least some of the electrons in the beam are focused whereas the regions between the curves represent stop bands, where practically all of the electrons are defocused. Curve 33 defines the primary pass band, the location of which depends upon the various parameters discussed in connection with the constant K, and in which the majority of the electrons are focused. Operation is advantageously in this pass band. Curves 31 and 32 are representative only of the higher order pass bands, of which there may be an infinite number.

During interaction in a traveling wave tube of the type shown in Fig. 1, the electron beam is velocity modulated. That is, certain of the electrons will be slowed up during their travel along the interaction circuit, while others will be accelerated. Thus if a sinusoidal wave is made to interact with the beam, the beam will exhibit a velocity variation, which is determined by the sinusoidal wave, about some average velocity. By the same token, interaction with a wave having a complex variation will result in a complex velocity variation in the beam about the average beam velocity. In the case of traveling wave tubes, the average beam velocity gradually decreases along the interaction circuit due to a net giving up of energy to the traveling wave. However, as soon as the interaction ceases, the average velocity is stabilized. In the tube of Fig. 1, the electron beam has a certain average velocity as it enters the drift tube 24, and this velocity remains substantially constant until the collector is reached. By proper choice of spacing and magnetic field strength in the periodic focusing arrangement of poles 25, 25 and magnets 26, 26, the primary pass band, as represented by curve 33 of Fig. 2A can be shifted along the abscissa. For this reason, as mentioned previously, it is desirable to use electromagnets for magnets 26, 26 so that adjustment may be made.

Assume that the average velocity of the beam as it enters drift tube 24 falls at the point X on the abscissa in Fig. 2A. Adjustment of magnet strength and/or the spacing of the magnets is such that the curve 33 is shifted to a position where the average velocity produces a collector current Y. If the beam is velocity modulated by a sinusoidal wave, the velocities of electrons in the beam vary about the average velocity as indicated by the curve 34. The resultant collector output current will be as indicated by the curve 35. Examination of the curves of Fig. 2A reveals that the periodic focusing arrangement of tube 11 is quite sensitive to changes in signal level or amplitude. A slight change in velocity in the beam results in a large change in collector current. By the same token, a slight decrease or increase in average velocity produces a large decrease or increase in collector current.

For sensitive detection of amplitude modulated waves, the primary pass band is positioned as shown in Fig. 2B. The curve 33' is situated relative to the average velocity point X' so as to produce a collector current Y. However, since the operating point is now near the knee of the primary pass band, increases in electron velocity will produce only slight changes in collector current, whereas decreases in electron velocity will produce large changes. If the beam is velocity modulated by an amplitude modulated wave to produce an electron velocity variation as shown by the curve 36, the collector current, and hence the detector output, will be as indicated by the curve 37. By feeding the output through an appropriate low pass filter to remove the R. F. wave, as is well known, the final result will be a wave which varies as the envelope of modulation.

In the foregoing, the operating point was located near the knee of the curve 33'. Detecting action can also be obtained by locating the operating point at the point where the curve 33' meets the abscissa. In such case, electrons having velocities slower than average would be defocused and collected by the drift tube 24, whereas the higher velocity electrons would reach the collector 14. While this arrangement is adequate, in practice it is found to be somewhat less sensitive than that where operation is at the knee of the curve. This can be explained by the fact that a large portion of electrons are defocused and serve no useful end, whereas at the knee of the curve, substantially all of the electrons are collected.

It is obvious from the foregoing, and from an inspection of Fig. 2B that the tube of Fig. 1 is a non-linear device. That is, the collector output is related to the signal input by other than a linear function. Since the device is non-linear it can be advantageously utilized as a mixer tube. If two frequencies are applied at the R. F. signal input, there will be at the collector both sum and difference frequencies. Appropriate filters at the collector output permit utilization of either one or both of the two groups of frequencies, any single frequency thus appearing at the collector. Such a mixer tube can be most advantageously utilized in high level mixing operations, which, heretofore, have been difficult of attainment because of the power limitations in the usual crystal mixer arrangements.

As mentioned previously, the present invention is applicable to most types of velocity modulation tubes. In Fig. 3 there is shown schematically by way of example, a klystron amplifier 41 embodying the present invention. Located at opposite ends of an evacuated envelope 42, which is of any suitable material such as, for example, a non-magnetic conducting material, are a source of a beam of electrons 43 and a target or collector electrode 44. The electron source 43 may be quite similar to the source 13 of tube 11 in Fig. 1, consisting of an electron emissive cathode, a heater unit, an intensity control element, and an electrode arrangement 45 for shaping and accelerating the beam. Target 44, like target 14 of tube 11, serves as a collector of electrons and is, accordingly, maintained at a suitable potential relative to the cathode of source 43. A reentrant type cavity resonator 46 is situated adjacent the source 43 and electrode structure 45 and serves as the input or buncher cavity of the tube. Coupling loop 47 energizes cavity 46 from an external signal source, not shown. Bunching of the electron beam is accomplished by means of input grids 48, 48 which act to velocity modulate the beam with the signal in cavity 46. Output cavity resonator 49 and its associated grids 50, 50 are separated from cavity 46 by a drift space 51 which is formed by the walls of envelope 42. Cavity 49 is connected to an external utilization circuit, not shown, by means of output coupling loop 52. A second drift space 53 a plurality of operating wavelengths long is located between cavity 49 and collector 44, and may be advantageously formed by an elongated extension of envelope 42. Coextensive with drift space 53 is a magnetic focusing region which is formed by a plurality of pole pieces 54, 54, uniformly spaced from each other by magnets 55, 55. As was the case with pole pieces 25, 25 and magnets 26, 26 in tube 11, pole pieces 54, 54 and magnets 55, 55 may take any one of a number of suitable forms, although, preferably, magnets 55, 55 are electromagnets instead of permanent magnets.

In operation, the cavity 46 is excited by a high frequency signal through loop 47, and the signal appears upon the grids 48, 48. As the electron beam passes through the grids 48, 48 it is velocity modulated by the signal. When the beam passes through grids 50, 50 the cavity 49 is excited in accordance with the variations in velocity of the electrons in the beam, and the energy in cavity 49 is extracted for utilization by loop 52. After the beam passes grids 50, 50 it enters the drift region 53 where it encounters the periodic focusing arrangement formed by poles 54, 54 and 55, 55. The action of the periodic focusing fields upon the beam is identical to the action in tube 11 of Fig. 1, and as a result, detection is obtained in the same manner. The collector current is then fed to an appropriate low pass filter and thence to a utilization circuit.

Heretofore, the principles of the invention have been illustrated by specific preferred embodiments of tube structures, so constructed as to give detecting action. However, the invention is applicable to other arrangements wherein some measure of sensitivity to signal level or amplitude change is required, but the tube or structure is intended to function in more than just a detector fashion. In Fig. 4 there is shown a traveling wave tube 61 which, along with its associated circuitry, functions as a regenerative base band pulse generator. Such an arrangement may be advantageously used in systems requiring repetitive short base band pulses, or in various types of testing systems, such as the testing of broadband low-pass amplifiers. Tube 61 comprises an elongated evacuated envelope 62 of glass or other suitable material. At one end of the envelope 62 is located an electron emissive cathode 63 and a heater element 64. A pulse input lead 65 is connected to cathode 63 through a suitable air tight seal. One lead 66 of the heater 64 is connected to ground and the other lead 67 of heater 64 is grounded through a heater power supply 68, shown schematically, by way of example, as a battery. Cathode 63 is connected to ground through a resistance 95. A control grid 69 is located adjacent the cathode 63, and, in the embodiment here shown, is maintained at ground potential. For proper control of the electron beam current it is necessary that the separation between grid 69 and cathode 63 be as small as possible. While in the embodiment here shown the grid 69 is maintained at ground potential and the signal is applied to the cathode, it is obvious to one skilled in the art that the same end of controlling the beam current can be attained by applying the signal to the grid 69 and maintaining the cathode 63 at some steady potential such as ground. Located adjacent the grid 69 are electrodes 70, which schematically represent the necessary focusing, shaping, and accelerating electrodes for properly forming and launching the beam into the interaction region. At the other end of envelope 62 is located a target or collector anode 71 which is maintained at a suitable positive potential relative to the cathode 63 by a battery 96. The interaction circuit comprises a helical conductor 72 which functions in the manner of the helix 16 of Fig. 1. As in Fig. 1, the helix 72 is connected at its input end to an external transmission line 73, by a helix coupler 74 and at its output end to line 75 by helix coupler 76. Couplers 74 and 76 may be identical with the couplers 17 and 19 of Fig. 1, or may take any one of a number of other suitable forms.

As was the case with tube 11 of Fig. 1, focusing of the beam along the interaction circuit is accomplished by a uniform magnetic field supplied by pole pieces 77 and 78, and magnet 79. Pole pieces 77 and 78, and magnet 79 may take any one of the forms mentioned in connection with Fig. 1. In lieu of the focusing arrangement here shown, various other arrangements well known to those skilled in the art may be used, and applicant does not intend to limit himself to the arrangements here shown and described.

A drift tube 80 extends along the path of flow from a point adjacent the output end of helix 72 to a point adjacent collector anode 71. Drift tube 80, which is of a suitable nonmagnetic conducting material, such as copper, establishes a drift space several operating wavelengths long. A periodic focusing region coextensive with the drift tube 80 is formed by pole pieces 81, 81 spaced apart by magnets 82, 82. Pole pieces 81, 81 and magnets 82, 82 may take any of the forms described in connection with tube 11 of Fig. 1, and, for the reasons stated previously, magnets 82, 82 are preferably electromagnets connected in alternating series opposition and through leads 83 and 84 to a suitable power supply, not here shown.

Collector anode 71 is connected to a suitable low pass filter 85 through lead 86. Filter 85 performs the function of removing the R. F. component of the detected output of tube 61, so that the output of filter 85 is a voltage wave of a shape corresponding to the modulation envelope. The output of filter 85 is fed to a multi-branch coupler 87 through lead 88. Coupler 87 may take any one of a number of forms well known to those skilled in the art which are capable of dividing the signal input among the plurality of output branches. One output branch of coupler 87 is used to feed a utilization circuit 89, while another branch of coupler 87 feeds a delay line 90. The output of delay line 90 is fed back through lead 91 to the signal input 65. Delay line 90 may simply be a long section of transmission line, the length of which, and consequently the time delay, is dependent upon the desired pulse repetition rate, as will be apparent hereinafter. In the circuit here shown, a source of R. F. signal 92 supplies helix 72 through transmission line 73. For reasons that will be apparent hereinafter, R. F. source 92 is preferably a source of high level unmodulated R. F. voltage. The output end of helix 72 is connected through coupler 76 and transmission line 75 to a load or utilization circuit 93.

In operation, a baseband pulse in the video frequency range is applied to the cathode 63 through input 65. The change in cathode potential causes a change in beam current, i. e., an intensity modulation of the beam, in accordance with the pulse shape. If there were no R. F. signal in helix 72, the collector current would have a steady D.-C. value, periodically pulsed to a higher D.-C. value in accordance with the repetition frequency of pulses on the cathode. However, the presence of an R. F. wave on helix 72 radically alters the situation as will be readily apparent from the following explanation.

If a very low level R. F. wave is introduced onto helix 72, the interaction between the pulse modulated beam and the wave will cause the wave to be pulse modulated, and the beam to be velocity modulated. The pulse modulated wave is fed through coupler 76, and line 75 to load 93 where it may be utilized or dissipated. The beam, as it enters the drift space formed by drift tube 80 has a velocity modulation resulting from interaction with the R. F. wave, and a density modulation resulting from the pulse input. The density of the beam is greatest at the same portion of the beam that the velocity excursions are greatest. In other words, the velocity modulation pulse and the density modulation pulse are coincident. From the preceding explanation of the detector action, it can readily be seen that the velocity modulation of the beam results in a decrease in average collector current. On the other hand the density modulation results in an increase in average collector current. Thus for low R. F. signal levels, the collector current exhibits some increase in average value. It is obvious that at some intermediate R. F. signal level, the defocusing of electrons in the beam by the periodic focusing arrangement results in a balancing of the effects of the two types of modulation on the average collector current, and this current remains unchanged. Further increase in R. F. signal level results in a phase reversal of the detected pulse because of the enhanced velocity modulation of the beam overcoming the effects of the original density modulation with a consequent decrease in average collector current. It now becomes obvious that if the R. F. signal level is high enough, the original pulse on the beam, manifested by a concentration of electrons and an increase in average collector current, is manifested after detection by a decrease in average collector current, so that, in relation to the beam current, the pulse is reversed in polarity. Further increases in R. F. signal level act to amplify this pulse, with no further reversals in polarity. As a result, the collector will "see" a beam current with a large negative pulse and a low average value whereas in the case of no R. F. signal, or low level signal, the collector "sees" a beam current with a small positive pulse and a high average value.

In the arrangement of Fig. 4, the R. F. source 92 supplies an R. F. signal of sufficiently high level to produce at the collector a large negative pulse as was explained in the foregoing. The collector current is fed to low pass filter 85 to remove the R. F. component of collector current, and the output of filter 85 is a D.-C. current having a large negative pulse. Coupler 87 divides the output of filter 85, a portion of the signal being routed to the pulse utilization circuit, and the remainder being returned to cathode 63 through delay line 90 and lead 91. The arrival of the signal on cathode 63 commences the cycle again. It can be seen, from the foregoing, that a single external pulse commences the generation of a plurality of pulses, the repetition rate of the pulses being determined by the time required to complete the foregoing cycle. Obviously the repetition rate may be easily varied by making the delay line 90 adjustable.

In the foregoing explanation, a negative pulse system was disclosed. It is obvious to one skilled in the art that a positive pulse system could be used without any change, if the pulse utilization device requires positive pulses.

While specific structures have herein been shown as embodying the principles of the present invention, it is obvious that these principles are applicable to many other types of apparatus wherein some measure of control of the electron stream may be had. Application of the principles herein disclosed to such other apparatus can easily be accomplished without departing from the spirit and scope of the appended claims.

What is claimed is:

1. A velocity modulation tube for operation in the microwave range comprising, in combination, an envelope, means including a source of electrons and a collector axially disposed within said envelope for forming and projecting an electron stream within the envelope, signal input means between said source of electrons and said collector, output means between said input means and said collector, and means establishing a periodic focusing region between said output means and said collector.

2. A velocity modulation tube according to claim 1 in which said periodic focusing region comprises a plurality of spatially alternating focusing fields.

3. A velocity modulation tube according to claim 1 in which said tube is a traveling wave tube.

4. A velocity modulation tube according to claim 2 in which said tube is a klystron tube.

5. A velocity modulation tube for operation in the microwave range comprising, in combination, an envelope, means including a source of electrons and a collector axially disposed within said envelope for forming and projecting an electron stream, signal input means between said source of electrons and said collector, signal output means between said input means and said collector, means establishing an interaction region between said source of electrons and said output, means between said output and said collector establishing a drift space for said electron stream, and means coextensive with at least a portion of said drift space establishing a periodic focusing region in said drift space.

6. A velocity modulation tube according to claim 5 in which said periodic focusing region comprises a plurality of spatially alternating focusing fields.

7. A velocity modulation tube according to claim 5 in which said means establishing a periodic focusing region is magnetic.

8. A velocity modulation tube according to claim 5 in which said means establishing a periodic focusing region comprises a plurality of pole pieces spaced apart by permanent magnet members.

9. A velocity modulation tube according to claim 5 in which said means establishing a periodic focusing region comprises a plurality of pole pieces spaced apart by electromagnetic members.

10. A velocity modulation tube for operation in the microwave range comprising, in combination, an envelope, means including a source of electrons and a collector axially disposed within said envelope for forming and projecting an electron stream, means associated with said source for varying the density of said stream in accordance with a signal between said source and said means, signal input means between said source of electrons and said collector, signal output means between said input means and said collector, means establishing an interaction region between said source of electrons and said output, means between said output and said collector establishing a drift space for said electron stream, and means coextensive with at least a portion of said drift space establishing a periodic focusing region in said drift space.

11. A velocity modulation tube according to claim 10 in which said periodic focusing region comprises a plurality of spatially alternating focusing fields.

12. A velocity modulation tube according to claim 10 in which said means establishing a periodic focusing region is magnetic.

13. A high frequency detector for operation in the microwave range comprising, in combination, an envelope, means including a source of electrons and a collector axially disposed within said envelope for forming and projecting an electron stream, signal input means between said source of electrons and said collector, signal output means between said input means and said collector, and means establishing a spatially alternating focusing field between said output means and said collector for varying the magnitude of the collector current in accordance with changes in signal level.

14. A high frequency detector for operation in the microwave range comprising, in combination, an envelope, means including a source of electrons and a collector axially disposed within said envelope for forming and projecting an electron stream, signal input means between said source of electrons and said collector, signal output means between said input means and said collector, means establishing an interaction region between said source of electrons and said output, means between said output and said collector establishing a drift space for said electron stream, and means coextensive with at least a portion of said drift space establishing a periodic focusing region in said drift space.

15. A high frequency detector according to claim 14 in which said means establishing an interaction region comprises a wave propagation circuit between said input and said output means.

16. A high frequency detector according to claim 14 in which said means establishing an interaction region comprises a standing wave circuit.

17. A regenerative base band pulse generator comprising, in combination, a velocity modulation tube having means for forming an electron beam, means for density modulating said beam under the control of base band pulses, means for velocity modulating said beam under the control of radio frequency signals, said velocity modulations being superimposed on the density modulations, means for selectively enhancing the velocity modulation on the beam to produce a density modulation on the beam opposite in phase to the density modulation on the beam produced by the first of said modulating means, means axially disposed relative to said beam forming means for collecting the beam for deriving therefrom output pulses, and means external to the tube for supplying said output pulses to the first mentioned modulating means.

18. A regenerative base band pulse generator as claimed in claim 17 wherein the means external to said tube comprises low pass filtering means connected to said beam collecting means, coupling means connected to the output of said filtering means for coupling to a pulse utilization circuit, and a delay line connecting the coupling means to the first of said modulating means.

19. A regenerative base band pulse generator as claimed in claim 17 in which the means for selectively enhancing the velocity modulation on the beam comprises a beam focusing arrangement having a plurality of spatially alternating focusing regions.

20. A frequency mixer for operation in the microwave range comprising, in combination, a velocity modulation tube having an envelope, means including a source of electrons and a collector axially disposed within said envelope for forming and projecting an electron stream, signal input means between said source of electrons and said collector, signal output means between said input means and said collector, and means establishing a spatially alternating focusing field between said output means and said collector for varying the magnitude of the collector current in accordance with changes in signal level; and filtering means in circuit with said collector for selectively filtering the frequency components of the collector current.

21. A velocity modulation tube for operation in the microwave range, comprising, in combination, an envelope, means including a source of electrons and a collector axially disposed within said envelope for forming and projecting an electron stream, signal input means between said source of electrons and said collector, means establishing an interaction region between said input means and said collector, means between the end of said interaction region remote from said input means and said collector establishing a drift space for said electron stream, and means coextensive with at least a portion of said drift space establishing a periodic focusing region in said drift space.

References Cited in the file of this patent

UNITED STATES PATENTS

| | | |
|---|---|---|
| 2,296,355 | Levin | Sept. 22, 1942 |
| 2,362,209 | Litton | Nov. 7, 1944 |
| 2,407,298 | Skellet | Sept. 10, 1946 |
| 2,602,148 | Pierce | July 1, 1952 |